United States Patent [19]

Schneider et al.

[11] 3,783,901
[45] Jan. 8, 1974

[54] ELECTRO HYDRAULIC CONTROL UNIT
[75] Inventors: Klaus Schneider, Ludwigsburg;
Heinz Flaschar, Asperg, both of
Germany
[73] Assignee: Robert Bosch GmbH, Stuttgart,
Germany
[22] Filed: Mar. 13, 1973
[21] Appl. No.: 340,823

[30] Foreign Application Priority Data
Mar. 20, 1972  Germany.................. P 22 13 439.0

[52] U.S. Cl. ........................................... 137/625.64
[51] Int. Cl. ....................... F16k 11/07, F16k 31/02
[58] Field of Search.................... 137/625.6, 625.64

[56] References Cited
UNITED STATES PATENTS
2,615,466  10/1952  Garde.............................. 137/625.6
2,716,425  8/1955  Yarber........................... 137/625.64

*Primary Examiner*—Henry T. Klinksiek
*Attorney*—Michael S. Striker

[57]  ABSTRACT

A fluid-pressure controlled piston element is shiftable in a housing element and a valve, including a preselecting member movable from a rest position for controlling the flow of pressure fluid and preselecting the position of the piston element, is provided. A solenoid moves the preselecting member from its rest position, and the solenoid and valve are both connected with one of the elements whereas a restoring device connects the preselecting member with the other of the elements and permanently urges the preselecting member to its rest position.

15 Claims, 2 Drawing Figures

ELECTRO HYDRAULIC CONTROL UNIT

BACKGROUND OF THE INVENTION

The present invention relates generally to a control unit and more particularly to electro-hydraulic control unit. Still more particularly, the invention relates to an electro-hydraulic control unit for the remote control of valves.

In many instances it is desirable or even necessary to control valves, usually slide valves, from a remote location by means of an appropriate control unit, for instance an electro-hydraulic or via an other suitable control unit. Thus, U.S. Pat. No. 2,615,466 proposes a slide valve having such a control unit wherein the main slidable valve member of the slide valve is provided with a differential piston the supply of pressure fluid to which is controlled via an electromagnetically operated preselecting member which is spring-biased. A flow of control fluid under pressure is constantly directed to this arrangement, flowing in a circuit via throttling passages.

This construction is not satisfactory in all circumstances. On the one hand, the constant flow of such pressure fluid can and does lead to substantial losses of energy. Moreover, the armature of the electromagnet which is connected with the preselecting member must share the entire stroke of the main valve member of the valve so that in the case of maximum deflection of the main valve member the electromagnet must exert maximum force upon the armature. Moreover, such valve members are usually constructed for movement which is not less than several millimeters and with the aforementioned considerations in mind an electromagnet which can be used in such arrangement must be of rather large dimension and relative expensive. Futhermore the electromagnet must be coordinated with the stroke of the main valve member so that different parts of units, wherein the valve member moves different distances, require different electromagnets. Finally, the construction is relatively expensive because the main valve member and the preselecting member extend concentrically with reference to one another and the main valve member cannot be manually operated, for instance in the event of malfunction of the remote control arrangement.

SUMMARY OF THE INVENTION

It is a general object of the present invention to overcome the disadvantages of the prior art.

More particularly, it is an object of the present invention to provide an improved control unit of the type in question which avoids these disadvantages.

Still more particularly, it is an object of the invention to provide such an improved control unit which is particularly simple and small in its construction and which is highly versatile in its application.

In keeping with these objects and others which will become apparent hereafter, one feature of the invention resides in a control unit, particularly for the remote control of valves, wherein there is provided a housing element, and a pressure-fluid controlled piston element shiftable in the housing element. Valve means is provided including a preselecting member movable from a rest position for controlling the flow of pressure fluid and preselecting the position of the piston element. Solenoid means is provided for moving the preselecting member from its rest position, and both of the means are connected with one of the element. Restoring means connects the preselecting member with the other of the elements and permanently urges the preselecting member to its rest position.

This construction avoids the disadvantages of the prior art and affords the benefits which are sought. In particular, it is possible to use an electromagnetic arrangement, such as the solenoid means wherein the armature need not participate in the entire movement of the main valve member of the valve being controlled, but need move only a small fraction of the distance. Moreover, the force exerted by the electromagnet upon the armature need only be proportional to the electrical input signal, and because it is thus possible to use a so-called proportional electromagnet, the construction can be smaller and simpler than what has been known from the art, in particular from electromagnets having relatively large armature displacement path. This in turn makes it possible to utilize a control unit according to the present invention in circumstances where the limited available space has heretofore precluded their employment, for instance in the case of remote controlled slide valves which are constructed in modular form. It has been found particularly advantageous if the construction according to the present invention is such that it can be utilized with any type of slide valve, requiring merely the replacement of the spring of the withdrawing means for another one to accommodate it to a different slide valve.

It is also particularly advantageous if, in accordance with the present invention, the solenoid means and the valve means are fixedly connecting with the housing element, with the restoring means providing for an operative connection between the preselecting member and the piston element. This permits the solenoid means to be stationarily mounted which means that the manner in which electrical energy is supplied can be particularly simple and also that the total unit can be very small in its overall dimension. Such a unit is particularly advantageous as a modular unit, that is its various components can be constructed as modules which can be readily connected with one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
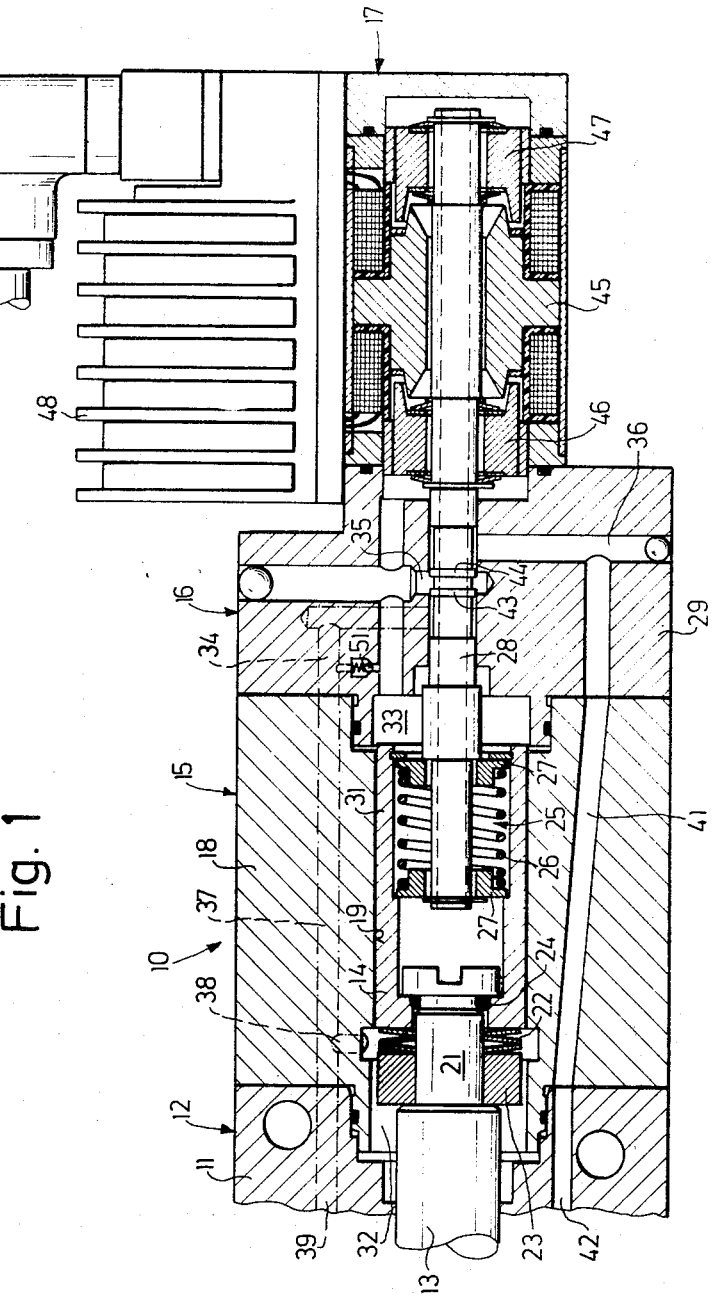
FIG. 1 is a section illustrating one embodiment of the invention, and also showing in fragmentary section a portion of the slide valve with which it is connected.

Discussing firstly the embodiment in FIG. 1, it will be seen that the control unit according to the present invention is designated in toto with reference numeral 10, whereas the slide valve which it controls is shown fragmentarily and is designated with reference numeral 12.

The control unit 10 is essentially composed of a module 15, a module 16 and a module 17 which are connected in this sequence as shown.

The module 15 is connected in suitable manner (not illustrated) to a housing 11 of the valve 12 and its purpose is to control movement of the fragmentarily shown main valve element 13 of the valve 12. Valve element 13 is slidable in direction between left and right sides of FIG. 1.

The module 15 has a housing 18 which is connected with the housing 11 of the valve 12; it is provided with a bore 19 that is concentric with the valve member 13 of the valve 12. A component 14 which, as will be seen later, constitutes a piston element 31, is slidably and sealingly accommodated in the bore 19 and fixedly connected with the valve member 13 via a bolt or screw 21, dished springs 22 and a spacing ring 23. An O-ring 24 is located between the bolts 21 and component 14, serving to seal the bore 19 at opposite sides of the component 14 and also permitting the latter a small freedom of play with reference to the valve member 13.

The other end of the component 14 which is away from the valve member 13 accommodates a double-acting restoring device 25 having a restoring spring 26 which bears via two abutment plates 27 upon the component 14 on the one hand, and a preselecting member 28 on the other hand. The preselecting member 28 has a portion extending out of the valve housing 29 and into the interior of the component 14.

The preselecting member 28 is a part of a second module of the unit, namely the valve module 16 which is mounted on the housing 18 of the first module. The preselecting member 28 has a diameter which is smaller than that of the valve member 13 so that the component 14 constitutes a differential piston, namely the aforementioned piston 13, the smaller effective surface of which faces a first pressure chamber 32 between the housing 18 and the housing 11 whereas its larger effective surface faces a second pressure chamber 33 defined between housing 18 and housing 29.

The valve module 16 is constructed as a three-way three-position slide valve; it has a first port 34, a second port 35, and a third port 36. The preselecting member 28 is shown in its neutral or rest position in which the three ports 34 – 36 are separated from one another, that is, they do not communicate.

The port 34 communicates via bores 37 and 38 in the housing 18 with the first chamber 32, and via the bore 38 it also communicates with an inlet channel or supply channel 39 in the housing 12. The channel 39 as well as the bores 37, 38 and the first port 34 are shown in broken lines in FIG. 1 because they are located in a plane which is offset out of the plane of FIG. 1. The second port 35 is connected with the chamber 33 whereas the third port 36 is in communication with a return flow channel 42 in the valve housing 1 via a bore 41 in the housing 18. The preselecting member 28 is provided with annular beads defining a first control edge 43 and a second control edge 44; when the member 28 is moved out of its central neutral or rest position into a working position (either to the left or to the right in FIG. 1), these control edges control the communication between the first and second ports 34, 35 or between the second and third ports 35, 36. The valve 16 is constructed with a small positive overlap.

FIG. 1 also shows that there is provided the already mentioned third module 17, namely the solenoid. It has a double-acting proportional electromagnet 45 provided with two armatures 46, 47 which are mounted on a portion of the preselecting member 28. The module 17 is connected with the housing 29 of the module 16 at the side of the latter which faces away from the module 15, as illustrated. Laterally off or above the module 17 there is provided an amplifier stage 45 which is of known construction and provided with the electrical input 49 which may be connected with a non-illustrated potentiometer, an inductive signal generator or an electronic control device for supplying a signal indicative of a desired position. The armatures 46 and 47 of the magnet 45 need perform only a small movement of approximately 1 millimeter length which is minute by comparison to the movement which must be carried out by the valve member 13 of the valve 12 namely approximately 8 millimeters or even more. On the other hand, the solenoid, that is the electromagnet 45 thereof, has a characteristic current line which is largely linear so that the force exerted upon the respective armature is also proportional to the current.

The operation of the unit illustrated in FIG. 1 will already have been understood. If no signal is applied at the electrical input 49, then the preselecting member 28 is in the illustrated rest or neutral position in which it is hydraulically centered, as will be described subsequently. The full control pressure is active in the channel 39, in the chamber 32, and the bores 37 and 38 and in the port 34. In the second port 35 and in the chamber 33 a pressure will develop under these circumstances which is equal to one half of the control pressure, because the effective surfaces at the differential piston 31 have a ratio of 1 : 2. When these pressure relationships obtain, the first control edge 43 blocks or interrupts the communication between the chambers 32 and 33 whereas the second control edge 44 blocks or interrupts the communication between the second port 35 and the third port 36.

If, now, the valve member 13 and thereby via the component 14 the preselecting member 28 should be moved towards the left for any reason whatsoever, then the pressure in the chamber 33 decreases and the full control pressure acting in the chamber 32 shifts the differential piston 31 back to its neutral position. Pressure medium which leaks past the control edge 43 builds up the half control pressure in the second chamber 33 wherein it will had dropped as a result of the left-hand movement, and the member 28 will become hydraulically centered again. Conversely, if the member 28 is displaced towards the right for any unintentional reason, the first control edge 43 will connect the chambers 32 and 33 with one another so that the pressure which increases in the chamber 33 during the right-hand movement will again serve to center the member 28, and of course, the member 13 therewith.

If, however, an electrical signal is supplied at the input 49, then in accordance with the current supplied either the armature 45 or the armature 46 will be attracted by the electromagnet with a force which is proportional to the current value. If it is assumed that the armature attracted is the one designated with reference numeral 46, then it will be seen that the armature is displaced towards the right, moving the member 28 along with it and permitting the control edge 43 to establish communication between the chambers 32 and 33. As a result of this right-hand movement the pressure in the chamber 33 increases and pushes the differential piston 31 towards the left until the restoring spring 36 which has also been compressed during such movement exerts upon the member 28 a force which is equal to the force exercised by the armature 46 but acts oppositely thereto. In this equilibrium condition, the member 28 will now move back to its center or rest position in which all three ports 34, 35 and 36 are blocked one relative to the other. Thus, the force acting upon the armature 46 is converted via the spring 26 into a path of movement of the component 14, which latter in turn moves via valve member 13 correspondingly.

Assuming that the position just described has been reached by the member 28 and the force acting upon the armature 46 is further increased, then the just-described procedure will be repeated until again a force equilibrium will act upon the member 28 with the latter being in its neutral position, and with the component 14 performing a movement which is a greater movement which is proportional to the greater force acting upon the armature 46, that is the higher current supplied.

Conversely, when the force acting upon the armature 46 in the displaced position of the component 14 decreases, then the spring 26 displaces the member 28 towards the left in FIG. 1 and the control edge 44 establishes communication between the chamber 33 and the port 36 and thereby to the channel 42. Since this means that fluid can escape from the chamber 33, the pressure acting in the chamber 32 shifts the component 14 towards the right until the force of the spring 26 and that exercised by the armature 46 will again be in equilibrium, the member 28 then being in its neutral position. When this is the case then the displacement of the component 14 is again proportional to the current supplied at the input 49. It will be appreciated that due to the double-acting construction of the proportional magnet 45, and the double-acting restoring device 25, the component 14 can be displaced towards the right from its center position in a corresponding manner.

As pointed out before, the valve module 16 is constructed with a small positive overlap in order to maintain the energy losses as small as possible. Despite this positive overlap it is possible with the construction according to the present invention to obtain a proper hydraulic centering of the component 14 and thereby of the valve member 13 so that precise and finely-regulated control can be obtained.

The valve 12, which has not been illustrated in detail, is a valve of conventional type which advantageously is provided at its side which is not illustrated and which is remote from the unit 10 with a conventional manually operable device permitting manual shifting of the valve member 13 in the event the unit 10 or the current supply to it should malfunction.

It will be appreciated that if the member 13 is to be displaced towards the right in FIG. 1 by means of the manual device, pressure fluid must be expelled from the chamber 33. For this purpose a one-way valve 51 is interposed between the ports 34 and 35 to protect the chamber 33. If the valve member 13 is displaced towards the left, then suction will develop in type chamber 33 but will be so negligible that it will not in any way influence the operation of the manual device, that is it will not hinder the manual displacement of the valve member 13.

It is advantageous if the effective surfaces on the piston 31, the selected control pressure and the force which can be exerted by the manually operable device are so coordinated that the hydraulic centering will cause a force to act upon the operating lever or component of the manually operable device which affords the user the same "feel" as a conventional mechanical restoring device.

If the position of the component 14 is to be automatically regulated, then it is possible to thread a control rod into the bolt 21 and to transmit via this control rod which extends through the hollow member 28 the displacement of the member 14 to the exterior of the unit 10, where it is fed to a non-illustrated device, providing a signal indicative of the particular position assumed by the component 14 at a given moment.

The electrohydraulic unit can be varied to be a hydraulic or pneumatic unit simply by replacing the solenoid module 17 with a double-acting hydraulic or penumatic piston and cylinder unit and supplying the respective unit with appropriate fluid under appropriate pressure.

Figure 2:
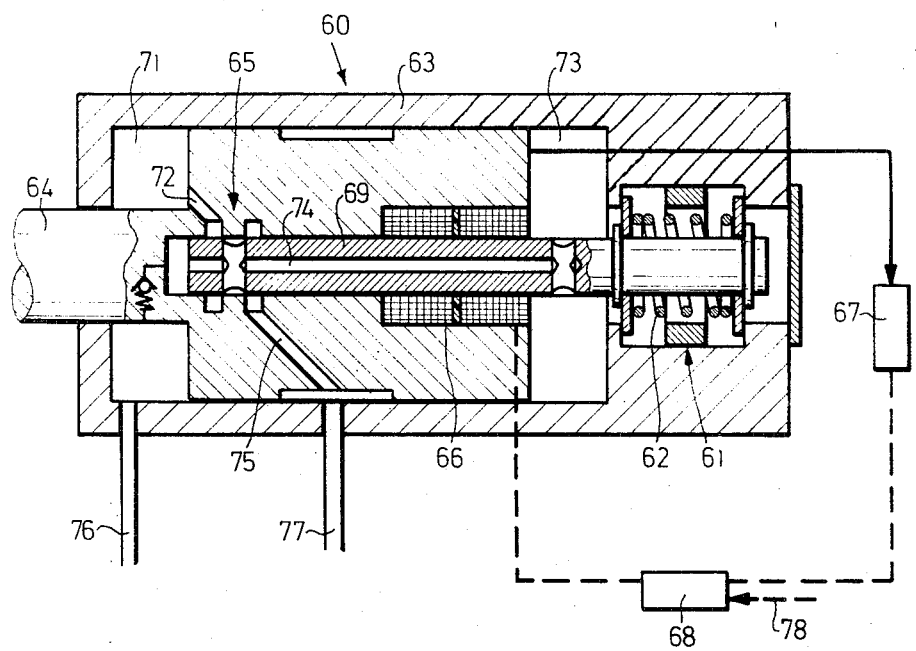
FIG. 2 is a simplified diagrammatic sectional view illustrating a further embodiment of the invention.

The embodiment of FIG. 2 designates the control unit in toto with reference numeral 60. The illustration here is simplified and diagrammatic.

The unit 60 differs from that shown in FIG. 1 primarily by the fact that a restoring device 61 with a restoring spring 62 is stationarily mounted in a housing 63. A movable component 64, configurated as a differential piston, accommodates a valve module 65 and a double-acting proportional electromagnet 66.

In addition, the embodiment of FIG. 2 has a unit 67 which provides a feedback signal indicative of the position of the component 64 at a given moment, and which unit 67 may be mounted directly and stationarily on the housing 63 if desired. There is also provided an electronic differential amplifier 68 operatively associated with the unit 67 so that the embodiment of FIG. 2 permits a control of the position of the component 64.

The preselecting member is identified with reference numeral 69 in this embodiment and is in part hollow; in its illustrated neutral position it separates a first port 72 communicating with a first pressure chamber 71, a second port 74 communicating with a second pressure chamber 73, and a third port 75. The first port 72 is in communication with an inlet conduit 76 for pressurized control fluid and the port 75 is in communication with a return flow conduit 77.

The member 65 has a further purpose, namely it acts as an armature for the double-acting proportional electromagnet 66 and bears upon the housing 63 via the restoring device 61. The component 64 is mechanically connected with a part of the unit 67 which senses the position of that component and supplies signals which are received by the differential amplifier 68. A further input 78 to the differential amplifier 68 supplies a command signal derived from a non-illustrated signal generating device which indicates via the command signal the desired position of the component 64. Thus, the error signal determined from the signals derived from the unit 67 and the command signal is amplified in the differential amplifier which is so connected with the proportional magnet 66 that the movement and the sealing effectiveness of the component 64 are not influenced.

Principally the operation of the unit 60 in FIG. 2 is the same as that in FIG. 1. The member 65 must always be in equilibrium due to forces exerted by the spring 62 and by the solenoid 66, respectively. This will be the case if the respective displacement of the component 64 is proportional to the respectively supplied command signal. The position control exercised in the embodiment of FIG. 2 assures that error-producing influences, primarily frictional forces, are largely eliminated so that the hysteresis that is even less than in the embodiment of FIG. 1.

It is particularly advantageous that either of these embodiments can be readily adapted to various different types of valves to be controlled (such as the valve 12 in FIG. 1) and which have valve members that must travel over different distances, simply by exchanging the springs 26 or 61, respectively. Such an exchange varies the distance through which the components 14 or 64 are displaced, and thereby permits a most simple accommodation to different valve member displacement distances in the valves to be controlled.

It will be understood that each of the elements described above, or two or more together, may also find a useful application in other types of constructions differing from the types described above.

While the invention has been illustrated and described as embodied in a control unit, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a control unit, particularly for the remote control of valves, a combination comprising a housing element; a pressure-fluid controlled piston element shiftable in said housing element; valve means including a preselecting member movable from a rest position for controlling the flow of pressure fluid and preselecting the position of said piston element; solenoid means for moving said preselecting member from said rest position, said solenoid means being connected with one of said elements; and restoring means connecting said preselecting member with the other of said elements and permanently urging said preselecting member to said rest position thereof.

2. A combination as defined in claim 1, wherein said valve means and said solenoid means are fixedly mounted on said housing means, and said restoring means connects said preselected member with said piston element.

3. A combination as defined in claim 1, said piston element being a differential piston having a smaller first and a larger second effective surface which respectively in part bound a first and a second pressure fluid chamber; an inlet passage and an outlet passage for said first chamber; and channel means in said housing and controllable by said preselecting member for connecting said second chamber with said inlet passage or said outlet passage, and for disconnecting said second chamber from both said inlet passage and said outlet passage, depending upon the position of said preselecting member.

4. A combination as defined in claim 3; further comprising a one-way valve interposed in said channel means intermediate said first and second chambers.

5. A combination as defined in claim 3, said valve means being a three-position three-way valve and comprising a housing in which said preselecting member is longitudinally movable.

6. A combination as defined in claim 5, said preselecting member being hollow so as to be adapted to accommodate a transmission rod for transmitting to said preselecting member of position-indicating signals originating in a position-indicating device.

7. A combination as defined in claim 1, said valve means comprising a housing located between said housing element and said solenoid means.

8. A combination as defined in claim 7, said solenoid means comprising an armature; and wherein said armature and said restoring means are mounted on said preselecting member.

9. A combination as defined in claim 8, wherein said piston element is hollow, said preselecting member extending partly into and said restoring means being located within said piston element.

10. A combination as defined in claim 1; and further comprising a slide valve having a housing connected with said housing element, and a valve member operatively connected with said piston element so as to be slidingly displaced by the same.

11. A combination as defined in claim 1, wherein said solenoid means comprises a double-acting proportional electromagnet.

12. A combination as defined in claim 9; further comprising a signal generating device for generating signals indicative of the actual position of said preselecting member; and an electronic differential amplifier associated with said electromagnet and operative for comparing said signals with a signal indicative of the desired position of said preselecting member, and for operating said electromagnet in dependence upon a detected difference between said signals.

13. A combination as defined in claim 12, wherein said signal generating device is fixedly mounted on said housing element.

14. A combination as defined in claim 1; further comprising a slide valve having a housing connected with said housing element, and a valve member operatively connected with said piston element so as to be slidingly displaced by the same; and manually operable means on said slide valve for effecting manual displacement of said valve member.

15. A combination as defined in claim 1, said elements together constituting a first module, said valve means constituting a second module and said solenoid means constituting a third module, and wherein all of said modules are arranged in axial alignment with one another.

* * * * *